No. 837,381. PATENTED DEC. 4, 1906.
C. BRADFORD.
ELEVATOR AND WEIGHER.
APPLICATION FILED OCT. 15, 1906.
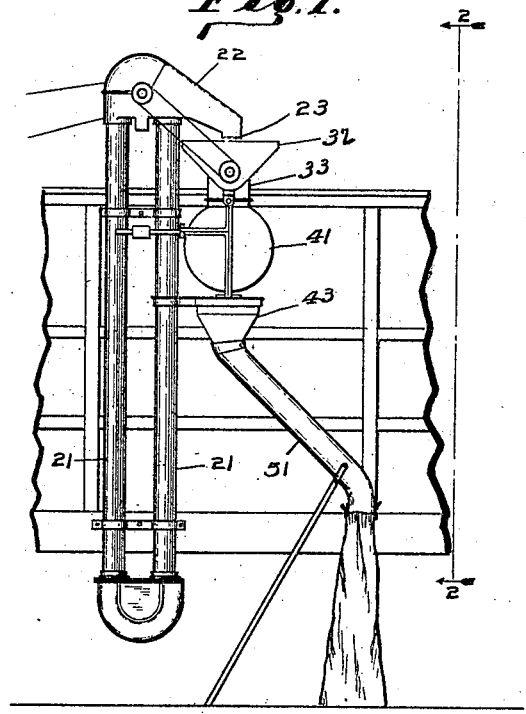
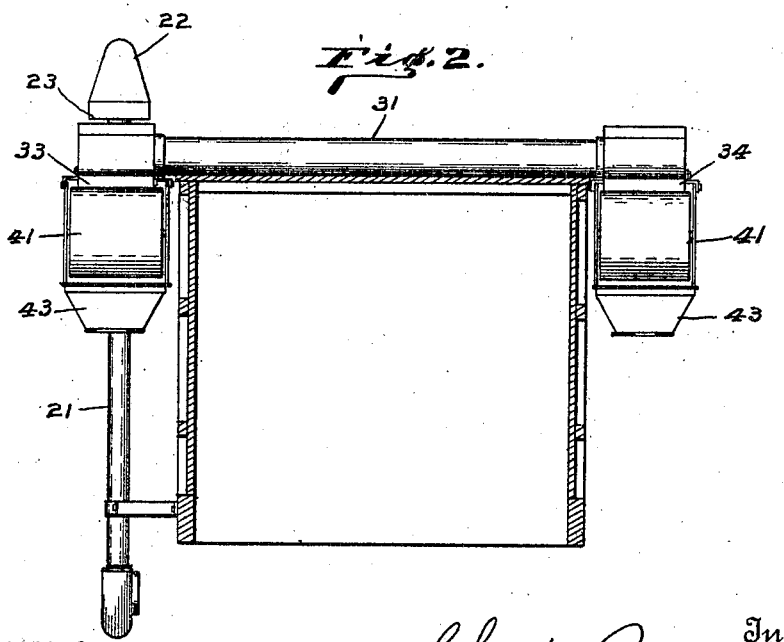

UNITED STATES PATENT OFFICE.

CHESTER BRADFORD, OF INDIANAPOLIS, INDIANA.

ELEVATOR AND WEIGHER.

No. 837,381.     Specification of Letters Patent.     Patented Dec. 4, 1906.

Application filed October 15, 1906. Serial No. 339,125.

*To all whom it may concern:*

Be it known that I, CHESTER BRADFORD, a citizen of the United States, residing at Indianapolis, in the county of Marion and State of Indiana, have invented certain new and useful Improvements in Elevators and Weighers, of which the following is a specification.

A modern complete threshing outfit or "rig" generally includes as an attachment to the threshing-machine or separator a grain elevator and weigher. In many localities the threshing is done in barns, and frequently the top of such a grain elevator and weigher as commonly constructed extends up so high above the threshing-machine as to require it to be folded down in order to pass through low barn-doors. There are other localities where in moving the threshing-machine from place to place there is occasionally danger of encountering limbs of trees and the like.

It is the object of my present invention to produce such a grain elevator and weigher much lower in height than the common variety, so that the disadvantages above stated may be obviated.

Said invention therefore consists in such an arrangement of the parts of which such a grain elevator and weigher is composed as to much reduce the height. This object is accomplished in the manner and by the means hereinafter stated.

Referring to the accompanying drawings, which are made a part hereof, and on which similar reference characters indicate similar parts, Figure 1 is a side elevation of a portion of a threshing-machine having a grain elevator and weigher attached thereto which embodies my present invention, and Fig. 2 a transverse sectional view across the threshing-machine alongside said elevator and weigher at the point indicated by the dotted line 2 2 in Fig. 1.

Ordinarily the weigher in a machine of the type illustrated in said drawings has been located between the discharge-mouth of the elevator-head and the receiving-hopper of the cross-conveyer. The consequence is that the said elevator-head has necessarily had to be a distance above said cross-conveyer sufficient to enable the weigher to be placed in position. In my invention the mouth of the elevator-head discharges directly into the receiving-hopper of the cross-conveyer, and a weigher is attached to each end of the cross-conveyer at the under side in position to receive the grain from the discharging-mouths thereof.

The elevator 21, its head 22, having discharge-mouth 23, the cross-conveyer 31, having receiving-hopper 32, and discharge-mouths 33 and 34 at its opposite ends, and the weighers 41, suspended to said cross-conveyer below and in position to receive the flow of grain from said discharge-mouths, may severally be of any ordinary or desired construction, my present invention residing wholly in the relative arrangement of the parts. Grain-delivering spouts or baggers, as 51, may also be provided of any usual or desired form and will be attached to suitable hoppers or heads, as 43, which are carried by or arranged just below the weighers and are provided for this purpose.

Having thus fully described my said invention, what I claim as new, and desire to secure by Letters Patent, is—

1. The combination, with a threshing-machine, of a grain-elevator, a cross-conveyer into which said elevator directly discharges, and a weigher suspended below the discharging-mouth of the cross-conveyer and adapted to receive the grain therefrom.

2. The combination of a threshing-machine, a grain-elevator, a cross-conveyer into which said elevator directly discharges, and a weigher arranged below each of the two discharging-mouths of said cross-conveyer.

In witness whereof I have hereunto set my hand and seal, at Indianapolis, Indiana, this 13th day of October, A. D. 1906.

CHESTER BRADFORD. [L. S.]

Witnesses:
     THOMAS W. MCMEANS,
     MAMIE CASSELL.